(12) United States Patent
Cui

(10) Patent No.: US 7,861,120 B2
(45) Date of Patent: Dec. 28, 2010

(54) METHOD AND APPARATUS FOR RUNTIME ERROR HANDLING

(75) Inventor: WeiYi Cui, Shanghai (CN)

(73) Assignee: SAP AG, Walldorf (DE)

( * ) Notice: Subject to any disclaimer, the term of this patent is extended or adjusted under 35 U.S.C. 154(b) by 462 days.

(21) Appl. No.: 12/002,070

(22) Filed: Dec. 14, 2007

(65) Prior Publication Data

US 2009/0158099 A1 Jun. 18, 2009

(51) Int. Cl.
*G06F 11/00* (2006.01)
(52) U.S. Cl. .......................................... 714/38; 717/124
(58) Field of Classification Search .................... 714/38; 717/124
See application file for complete search history.

(56) References Cited

U.S. PATENT DOCUMENTS

| 5,799,148 | A  | * | 8/1998 | Cuddihy et al. | ............... | 714/26 |
| 6,594,697 | B1 | * | 7/2003 | Praitis et al. | ................ | 709/225 |
| 7,325,045 | B1 | * | 1/2008 | Manber et al. | ............... | 709/219 |
| 2002/0087915 | A1 | * | 7/2002 | Perla et al. | ..................... | 714/15 |
| 2005/0038832 | A1 | * | 2/2005 | Feigenbaum | ................ | 707/202 |
| 2008/0091978 | A1 | * | 4/2008 | Brodsky et al. | ............... | 714/38 |

OTHER PUBLICATIONS

US 7,146,554, 12/2006, Hsu, et al. (withdrawn).

* cited by examiner

*Primary Examiner*—Philip Guyton
(74) *Attorney, Agent, or Firm*—Mintz Levin Cohn Ferris Glovsky and Popeo PC

(57) ABSTRACT

A method and an apparatus for receiving an error notification associated with a runtime error of a software application to generate a plurality of context attributes from a runtime state of the software application associated with an instant of time of the runtime error are described. One or more potential solutions are searched from a data storage including a solution repository based on the plurality of context attributes at substantially the same instant of time. An acceptable solution for the runtime error is determined based on the one or more potential solutions. The solution repository is updated with a new solution if the acceptable solution cannot be determined.

18 Claims, 13 Drawing Sheets

METHOD AND APPARATUS FOR RUNTIME ERROR HANDLING

FIELD OF INVENTION

The present invention relates generally to error handling for software applications. More particularly, this invention relates to automatic reporting and solutions search for runtime errors in client/server based software applications.

BACKGROUND

As the complexity of software applications increases, proper handling of runtime errors or software problems becomes more and more challenging. Exemplary error handling approaches such as forwarding a pre-defined error message, presenting an error code, and/or sending a code dump associated with a crash of a running software application, etc., are neither informative nor user friendly for most software application users. Additionally, as runtime errors may occur either in a local client or a remote server in software application such as web-based applications or Rich Internet Applications, uninformative or unfriendly error messages may further intimidate a user. Even after a software runtime error is reported for a support request, a user may still be required to constantly checking the status of the request, such as logging onto a customer support system from time to time, which is usually time consuming and cannot provide a timely response.

Furthermore, to offer service support, most software applications require users to make an effort to record or report encountered runtime errors. However, many users are either unable or not willing to identify necessary information surrounding encountered software problems, especially for runtime errors. Often times, such identification is not even possible as a software application may not provide a proper mechanism for a user to gather related field data. Worse yet, user driven interactions between a client and a server may still be allowed even after a runtime error occurs which may leave user data in an unpredictable state or make a system vulnerable in security. As a result, the cost of customer support services may increase significantly.

Besides, repeated runtime errors due to similar sources of software bugs may contribute to major waste in human effort to analyze observed software problems and provide corresponding solutions. It is not, however, uncommon that a large number of support efforts are directed to a small number of software problems. Consequently, the efficiency of customer support effort may be greatly compromised.

SUMMARY OF THE DESCRIPTION

The present invention includes a method and apparatus that receive an error notification associated with a runtime error of a software application to generate a plurality of context attributes from a state of the software application at the time of the runtime error. One or more potential solutions are searched from a data storage including a solution repository based on the plurality of context attributes generated. An acceptable solution for the runtime error is determined based on one or more potential solutions. The solution repository is updated with a new solution if an acceptable solution cannot be determined.

In an alternative embodiment, a software plug-in received from a remote server is executed to run a software application. A runtime error in the software application causes an error notification to generate an error message for the remote server. The error message includes a plurality of context attributes from the state of the software application at the time of the runtime error. A solution based on the plurality of context attributes is received from the remote server for presentation via a user interface.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
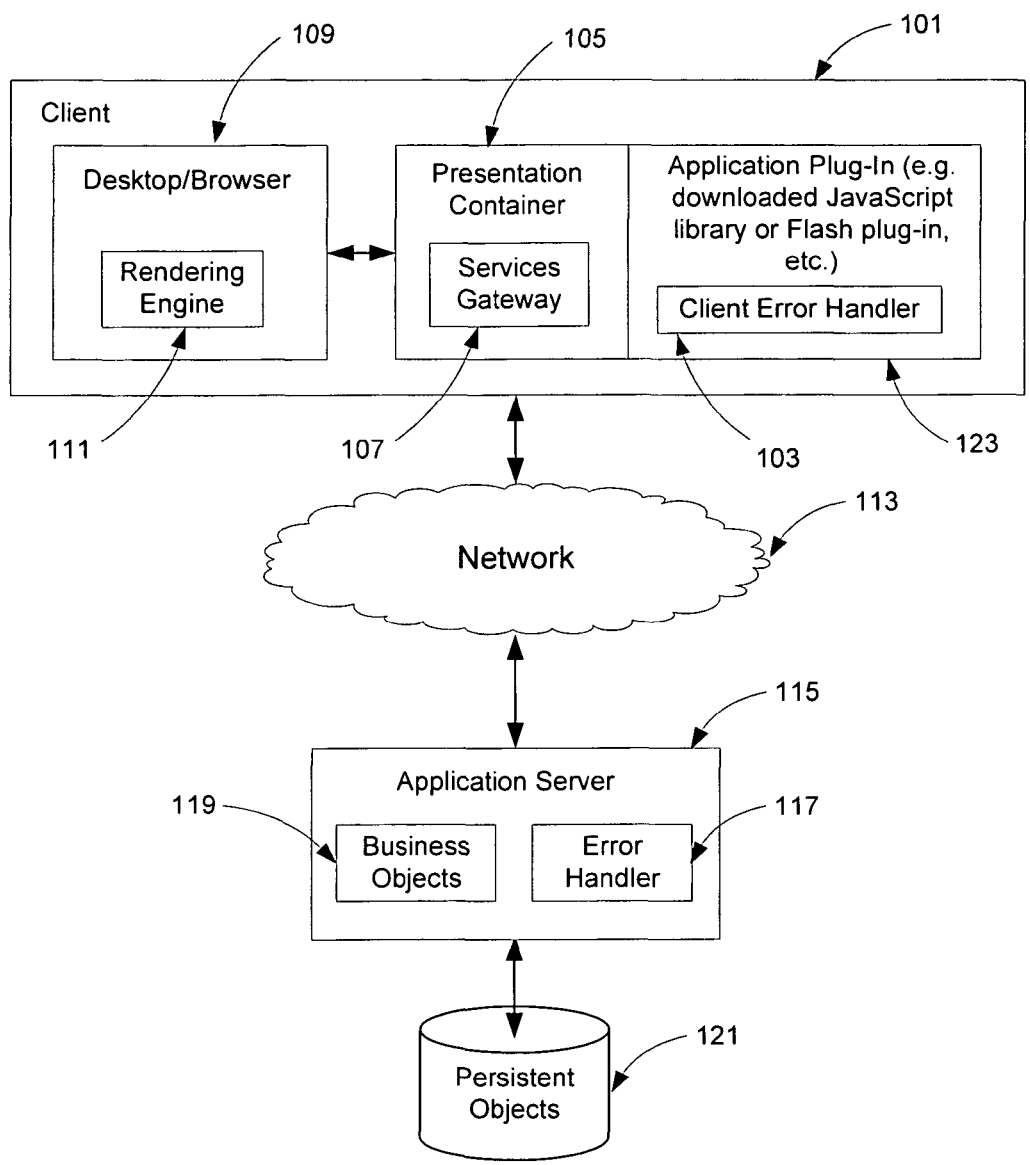
FIG. 1 is a block diagram illustrating one embodiment of a client server system for handling runtime errors.

A method and an apparatus for handling runtime errors are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, a system and a method for reporting, learning and tracking software problems in Rich Internet Applications are disclosed. The system may comprise a software problem repository which may include problem reports and solution descriptions for a software problem. Pop-up modal window may be invoked to block user interactions when an unexpected software problem occurs either in a client application, such as a desktop browser or in a backend server, such as an application server. A software problem repository or a solution database may be searched according to characteristics of corresponding software runtime errors, such as stack traces, exception types and source code locations, etc. Characteristics of a software runtime error may be extracted as error descriptions from a software runtime state, including automatically collected software runtime contexts and/or states from both a client and a server.

In another embodiment, for example, a software problem and a solution description may be matched to present a solution suggestion to an end user. A modal window having a report creation wizard may be prompted to solicit additional descriptions of encountered software runtime errors from a user. A software problem report may consist of problem characteristics, end user inputted problem descriptions, software runtime contexts and/or possible solutions. A semi-supervised learning mechanism may be provided to facilitate support personnel and/or solution providers for updating and adding solutions descriptions leveraging existing solutions corresponding to repeated or similar software problems. A support subscription service may be provided for an end user to track reported software problems when updates are available. An RSS (Really Simple Syndication) feed format may be employed in a support subscription service without requiring a user constantly logging into a customer support system. Note that throughout this application, for the illustration purposes, a system to handle software runtime errors is used as an example to illustrate techniques of embodiments of the invention. However, it is not so limited. It will be appreciated that other similar error handling systems may also be applied.

FIG. 1 is a block diagram illustrating one embodiment of a client server system for handling runtime errors. In one embodiment, a client device 101, such as a desktop computer, may conduct application transactions remotely with an application server 115 via a network 113, such as the Internet. A client 101 may include a browser 109 having a rendering engine 111 coupled with a presentation container 105 providing network interface functionalities via a service gateway 107. In one embodiment, a service gateway 107 may include supports for AJAX (Asynchronous JavaScript and XML (Extended Markup Language)), RIA (Rich Internet Application) and/or JavaScript. A rendering engine 111 may be a native browser specific graphics rendering engine such as Internet Explorer rendering engine from Microsoft Inc., a Gecko rendering engine employed inside a Mozilla, Firefox or Netscape browser, or a WebKit rendering engine included in a Safari, KHTML browser. In another embodiment, a render engine 111 may be a plug-in extended rendering engine dynamically downloaded to a browser 109 during runtime, such as Flash Player or SilverLight, etc.

A browser 109 may download application plug-ins 123, such as downloadable Java codes, from an application server 115 to provide application services including a client error handler 103 running in a client 101. A client error handler 103 may control how a browser 109 coupled with the associated application plug-ins 123 interact with an application server 115 when an error occurs while executing application plug-ins 123 in a client 101. An application plug-in may include downloadable executable codes such as a JavaScript library, a Flash plug-in or Java codes. In one embodiment, an application server 115 may provide remote services according to business logics associated with business objects 119. Optionally, a database 121 coupled with an application server 119 may provide persistent storage service for business objects 119. An application server 115 may execute an error handler 117 to handler runtime errors detected in an application server 115.

Figure 2:
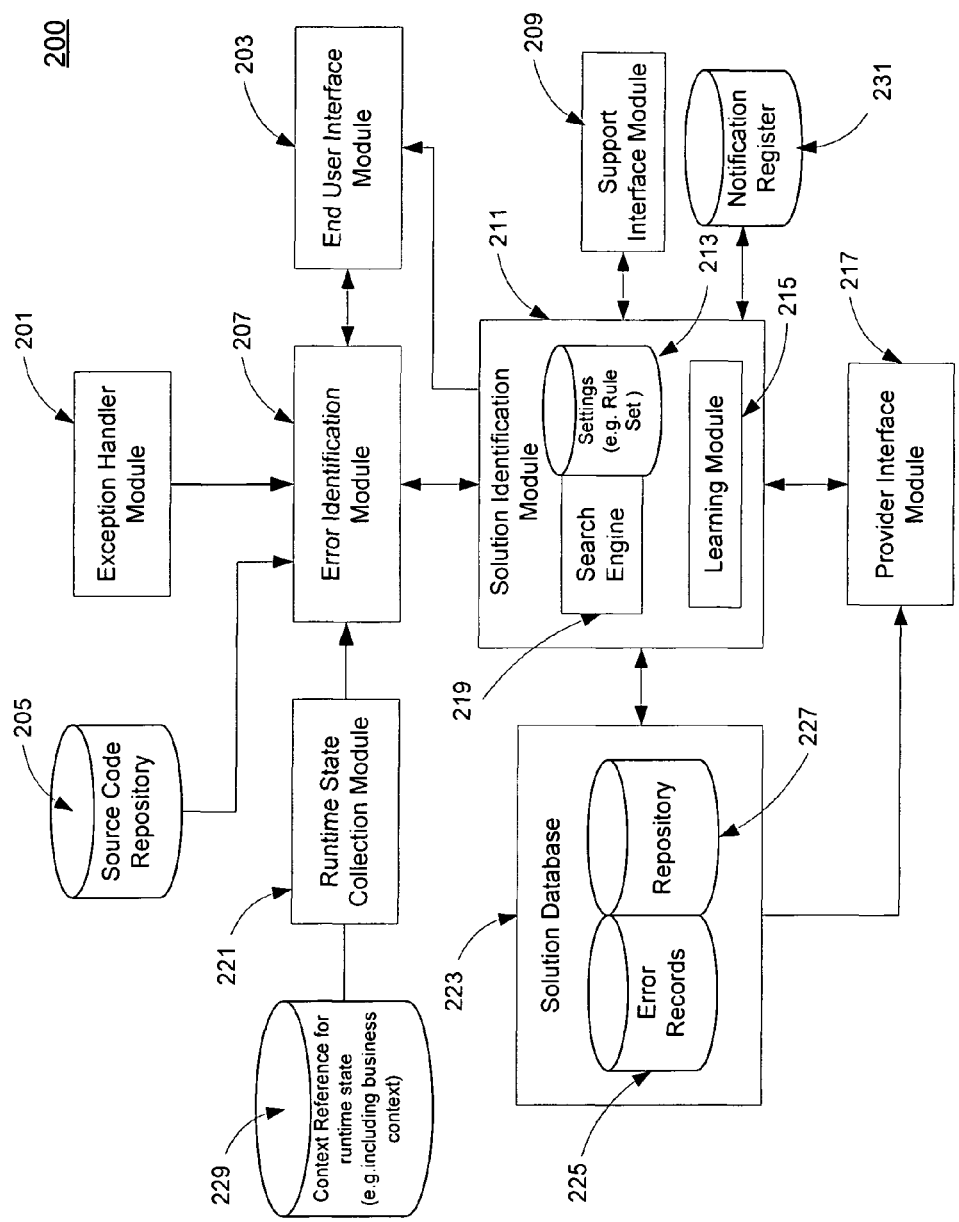
FIG. 2 is a block diagram illustrating one embodiment of a server system that handles runtime errors.

FIG. 2 is a block diagram illustrating one embodiment of a server system that handles runtime errors. System 200 may be included in an error handling module executed in a server, such as error handler 117 of application server 115 of FIG. 1. In one embodiment, an exception handler module 201 may receive an error notification indicating, for example, an occurrence of runtime errors or software problems from a running software application. An error notification may be activated via an API (Application Programming Interface) provided by an operating system supporting the running software application. In one embodiment, an error notification may be received remotely from a client computer running a software application, such as downloaded software plug-ins 123 of FIG. 1. An exception handler module 201 may extract error information, such as pairs of attribute and values, from a received error notification.

In response to receiving the extracted error information, an error identification module 207 may request an end user interface module 203 to present a pop-up modal window. In one embodiment, an end user interface module 203 may block a user from continuing an existing session of service between a client, such as client 101 of FIG. 1, and a server, such as application server 115 of FIG. 1, associated with a running software application invoking an error notification. An error identification module 207 may identify attributes of runtime errors associated with error information received, such as context attributes associated with a running software application where runtime errors occur. A context attribute may be related to a runtime state of a software application at the time a run time error occurs in the software application. A runtime state of a running software application may be related to values of runtime variables, traces of stacks, instantiated runtime objects, etc. at the time a runtime error occurs in the running software application. In one embodiment, a runtime state collection module 221 may selectively collect runtime state data related to a subset of the runtime state for a running software application at the time a runtime error occurs according to a context reference 229. Runtime state data may include one or more context attributes. A predetermined set of context references such as identifiers of target variables, modules and/or object classes may be stored in the context reference 229. An error identification module 207 may generate context attributes with corresponding values according to collected runtime state received from a runtime state collection module 221.

In another embodiment, an error identification module 207 may generate context attributes and corresponding values associated with a runtime error based on error information embedded inside an error notification, including source code line number, comments, local variables values, class object member information etc. Source codes may include specifications for embedding error information into an error notification when triggered during runtime. An error identification module 207 may derive context attributes based on a source code repository 205 storing data related to source codes corresponding to a running software application. Information stored in the source code repository 205 may include, for example, object class hierarchy, version number, or release date etc. related to a source code.

In one embodiment, an error identification module 207 may forward generated context attributes related to a runtime error to a solution identification module 211 for identifying potential solutions to correct the error. A solution identification module 211 may include a search engine 219 configured according to settings 213 to identify potential solutions from a solution database 223 based on received context attributes. In one embodiment, a degree of confidence may be assigned for an identified potential solution. Settings 213 may include a set of rules or one or more parameters employed by the associated search engine 219. In one embodiment, a solution database 223 may include a repository of solutions 227 and error records 225. A solution in a repository 227 may be associated with a text description and corresponding error information, including context attributes. Each record in error records 225 may include context attributes associated with a corresponding runtime error corresponding to the record. In one embodiment, if a solution identification module 211 determines an acceptable solution from a set of identified potential solutions for the received error information, the solution identification module 211 may generate a report from the accepted solution to present to a user via an end user interface module 203. An acceptable solution may be a potential solution associated with an error record having context attributes matching the received error information. If no acceptable solution is identified, a solution identification module 211 may register a notification address associated with a user to a notification register 231 for sending a notification message to the user when an acceptable solution corresponding to a runtime error is available.

In one embodiment, a solution identification module 211 may present one or more identified potential solutions from a solution database 223 to support personnel via a support interface module 209. Updates to a solution in a solution database, such as modifying associated context attribute values, adding new context attribute associations, etc. may be performed via a support interface module 209. In another embodiment, a new solution may be added into a solution database 223 via a provider interface module 217 by a solution provider. A solution identification module 211 may receive instructions or feedbacks which specify target set of potential solutions to be identified based on particular error information via a support interface module 209 or a provider interface module 217. In one embodiment, a learning module 215 in a solution identification module 219 may adapt settings 213 associated with the search engine 219 to perform a search that identifies potential solutions from a solution database 223 confirming to a specified target set of potential solutions.

Figure 3:
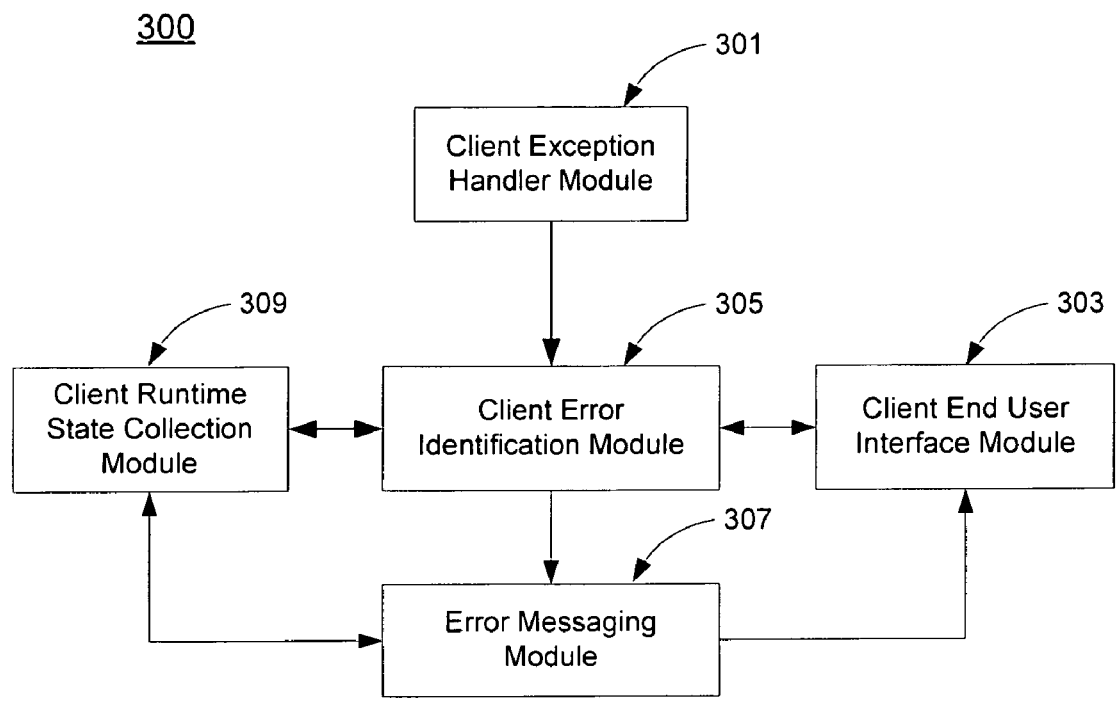
FIG. 3 is a block diagram illustrating one embodiment of a client system that handles runtime errors.

FIG. 3 is a block diagram illustrating one embodiment of a client system that handles runtime errors. System 300 may be included in a module executed in a client device, such as, for example, a client error handler module 103 of FIG. 1. In one embodiment, system 300 may be based on executable plug-in codes downloaded on the fly during runtime from a remote server, such as an application server 115 of FIG. 1. For example, a client exception handler module 301 may receive an error notification indicating an occurrence of runtime errors or software problems from downloaded client codes, which may include the client exception handler module 301, executing in a client device. A client exception handler module 301 may extract error information from a received error notification for a client error identification module 305. On receiving the extracted error information, in one embodiment, a client error identification module 305 may cause a client end user interface module 303 to present a pop-up modal window to block an end user from continuing interacting with a client application other than the client end user interface module 303. A client error identification module 305 may activate a client runtime state collection module 309 to collect information on the runtime state of a running client software application associated with a received error notification at a client exception handler module 301.

In one embodiment, a client runtime state collection module 309 may retrieve client context references, such as stored in a context reference 229 of FIG. 2, remotely from an application server via an error messaging module 307. A client runtime state collection module 309 may determine which context attributes included in a client runtime state to collect based on retrieved client context references. In one embodiment, a client error identification module 305 may send client error notification messages to a remote server, such as application server 115 of FIG. 1, via an error messaging module 307. Client error notification messages may be packaged according to error notification received from a client exception handler module 301 and collected runtime state information from a client runtime state collection module 309. In one embodiment, an error messaging module may receive a solution report from a remote server about a runtime error to present to an end user via a client end user interface module 303.

Figure 4:
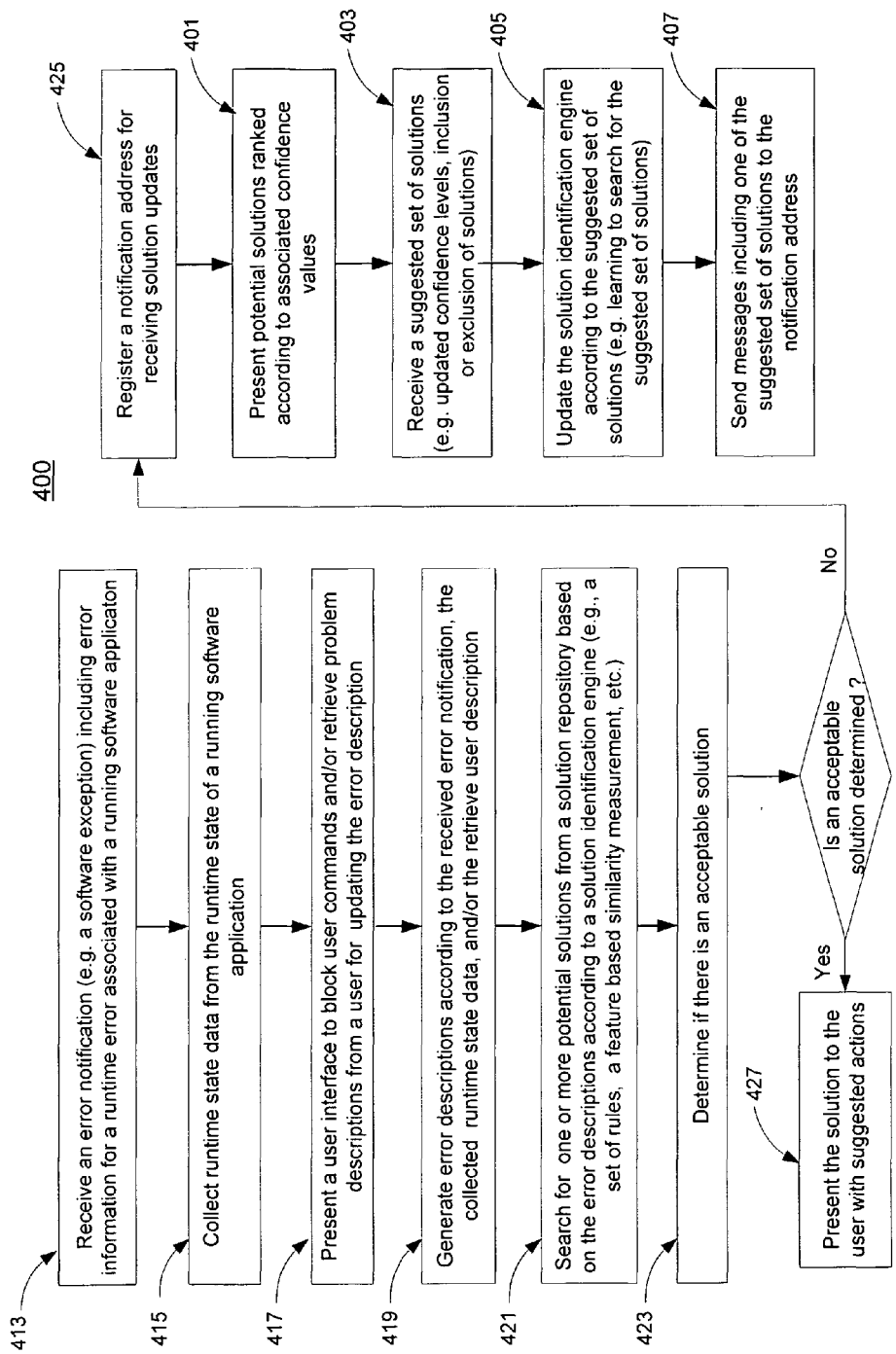
FIG. 4 is a flow diagram illustrating one embodiment of a process for handling runtime errors.

FIG. 4 is a flow diagram illustrating one embodiment of a process for handling runtime errors. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2. In one embodiment, the processing logic of process 400 may receive an error notification at block 413. A running software application may generate an error notification, such as a software exception, when detecting an error condition during runtime. In one embodiment, an error condition may be specified in source codes corresponding to the running software application, such as, for example, via try/catch blocks in Java or C++ program languages. In one embodiment, an error notification may be generated by a system hosting the running software application, such as a Java runtime machine or an operating system. An error condition may include, for example, a mismatch between a value of a runtime variable and a predetermined range of values. In one embodiment, an error notification may include error information related to a runtime state of a corresponding running software application, such as a source code location where a runtime error is detected, current values of a set of predetermined local and/or global variables, predefined comments about the runtime error, a name of the module or class where the runtime error is detected, etc.

At block 415, in one embodiment, the processing logic of process 400 may collect runtime state data of a running software application at the time when the error notification was triggered. A runtime state of a software application may be a runtime context including values and relationships among allocated variables and pointers in an associated memory storage for executing corresponding executable codes for the software application at a certain instant of time. In one embodiment, a runtime state may include values of data members belonging to class object instances, values of local and/or global variables, stack traces, size of runtime allocated memories, etc. Runtime state data collected may be a subset of a runtime state, selected according a predetermined context reference, such as a runtime context reference 229 of FIG. 2. A context reference may include specifications on targeted state information such as a list of names of variables, class data members, modules, and/or class member functions etc. In one embodiment, a context reference may be configurable independently from updating corresponding source codes for a target software application. At block 417, the processing logic of process 400 may present a user interface form to block user commands, such as interactions with a service provided by the running software application where a runtime error has occurred. In one embodiment, the processing logic of process 400 may retrieve user descriptions about the runtime error via the user interface presented. In one embodiment, at block 419, the processing logic of process 400 may generate error descriptions according to error information extracted from a received error notification, collected runtime state data and/or retrieved user descriptions for a runtime error. Error descriptions may include pairs of attribute/value. An attribute may be a variable name, a class name, and/or a predefined name such as, "source file name", "line number", "comment", etc. The processing logic of process 400 may update error records, such as error records 225 of FIG. 2, according to, for example, an error identity retrieved from a received error notification. In one embodiment, updating error records may include incrementing a count on the number of occurrences of a corresponding runtime error.

At block 421, the processing logic of process 400 may invoke a solution identification engine to search for potential solutions from a solution repository according to the generated error descriptions. A solution repository may include previously known solutions provided by a solution provider stored in a solution database such as solution database 223 of FIG. 2. In one embodiment, a solution in a solution repository may include a text description and/or instructions on how to resolve runtime errors. Each solution in a solution repository may be associated with a plurality of attribute values related to error descriptions. In one embodiment, a solution identification engine may perform a match between error descriptions and a solution from a solution repository to determine if the solution is a potential solution for the corresponding error descriptions. A solution identification engine may measure a similarity between a solution and error descriptions to make a determination whether a solution is a potential solution according to settings such as a set of rules and/or a set of features derived from attribute values associated with the solution. A solution identification engine may be configurable by updating associated settings such that the updated solution identification engine is capable of making desired determination. In one embodiment, each potential solution determined may include a confidence value indicating a confidence about the potential solution to solve the corresponding runtime error. A confidence value may be between 0 and 1. A potential solution of confidence value 1 may indicate a complete match with the error descriptions.

At block 423, the processing logic of process 400 may determine if an acceptable solution could be selected from the set of potential solutions. In one embodiment, the processing logic of process 400 may determine a potential solution with a confidence value above a predetermined confidence level is an acceptable solution. If an acceptable solution is found, at block 427, the processing logic of process 400 may update a solution database according to the accepted solution, such as, for example, incrementing an associated number indicating how many times the solution has been offered in response to reported runtime errors. In one embodiment, a solution database may include error records, such as error records 225 of FIG. 2, the processing logic of process 400 may present the accepted solution via a user interface to a user at block 429. In one embodiment, the processing logic of process 400 may generate a report including the accepted solution to forward the report to a client device for presentation.

At block 425, in one embodiment, if no acceptable solutions are determined, the processing logic of process 400 may register a notification address to receive an update (e.g. a callback) when the corresponding runtime error becomes available, such as, for example, a new solution for the corresponding runtime error is added to a solution database. A notification address may be registered in a database, such as a notification register 231 of FIG. 2. In one embodiment, an update may be sent to a notification address via an RSS (Really Simple Syndication) feed. In another embodiment, a notification address may be an email address. At block 401, the processing logic of process 400 may present a set of potential solutions ranked according to associated confidence values, such as determined by the search at block 421, to a user interface for a support personnel. In one embodiment, at block 403, the processing logic of process 400 may receive solution updates including a suggested set of solutions from, for example, support personnel. The set of potential solutions presented and the set of suggested set of solution received may differ in associated confidence values and/or member solutions included. At block 405, the processing logic of process 400 may update settings of a solution identification engine, such as a set of rules, conditions associated with a rule, and/or parameter values for feature based matching, to target the suggest set of solutions during a search in a solution database. Thus, a solution identification engine may learn to adapt received inputs from support or provider personnel. In one embodiment, the processing logic of process 400 may determine an acceptable solution from the suggested set of solution to send a message including the determined acceptable solution to a registered notification address, such as the address registered at block 425.

Figure 5:
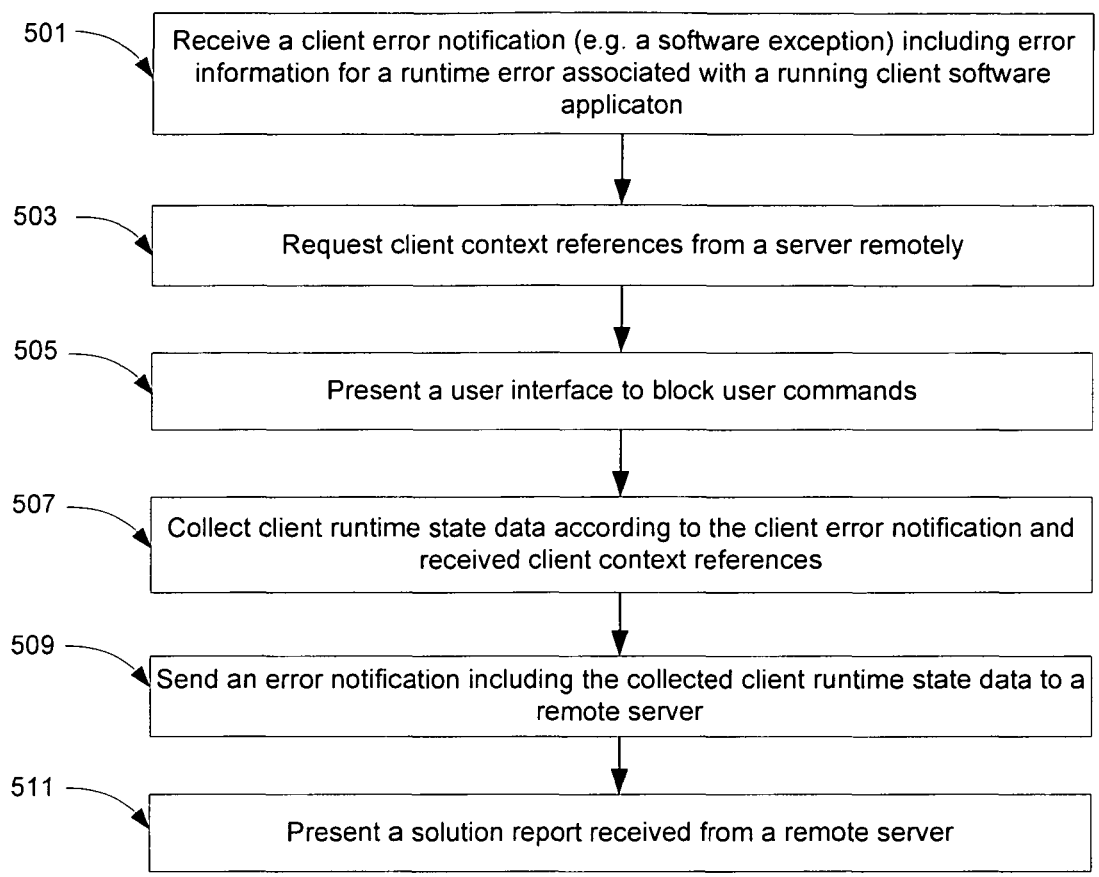
FIG. 5 is a flow diagram illustrating one embodiment of a client process for handling client runtime errors.

FIG. 5 is a flow diagram illustrating one embodiment of a client process for handling client runtime errors. Exemplary process 500 may be performed by a processing logic that may comprise hardware (circuitry, dedicated logic, etc.), software (such as is run on a dedicated machine), or a combination of both. For example, process 500 may be performed by some components of system 300 of FIG. 3. In one embodiment, the processing logic of process 500 may receive a client error notification at block 501. A running client software plug-in application downloaded from a remote server, such as an application server 115 of FIG. 1, may generate a client error notification during runtime, such as a software exception, when detecting occurrences of a client error condition in a client device, such as client 101 of FIG. 1. In one embodiment, a client error condition may be specified in source codes corresponding to the running client software plug-in application, such as, for example, via try/catch blocks in Java or C++ program languages, or from a hosting Java runtime machine or a client operating system.

At block 503, the processing logic of process 500 may send a request to a remote server, such as application server 115 of FIG. 1, for one or more client context references, e.g. context references related to the current runtime state of a client software plug-in application where a runtime error occurs. In one embodiment, the processing logic of process 500 may retrieve client context references locally stored in a client device hosting the processing logic of process 500, such as client 101 of FIG. 1. At block 505, the processing logic of process 500 may present a user interface to block user commands from interacting with a running client software application where a runtime error has occurred. At block 507, the processing logic of process 500 may selectively collect client runtime state data related to a subset of the runtime state of a running client software plug-in application at the time a runtime error occurs. In one embodiment, client runtime state data may be collected according to error information included in a client error notification received, or based on client context references received either from a remote server or retrieved locally.

At block 509, the processing logic of process 500 may send an error notification to a remote server, such as application server 115 of FIG. 1. An error notification sent from a client device may include error information embedded in a corresponding client error notification and/or collected client runtime state data. In one embodiment, the error notification from a client device may include error descriptions about a runtime error retrieved from a user via a user interface. The processing logic of process 500 may receive a response including a solution, such as a text description or instructions, for a corresponding client runtime error based on error information embedded in an error notification. At block 511, in one embodiment, the processing logic of process 500 may present a received solution to a user.

Figure 6:
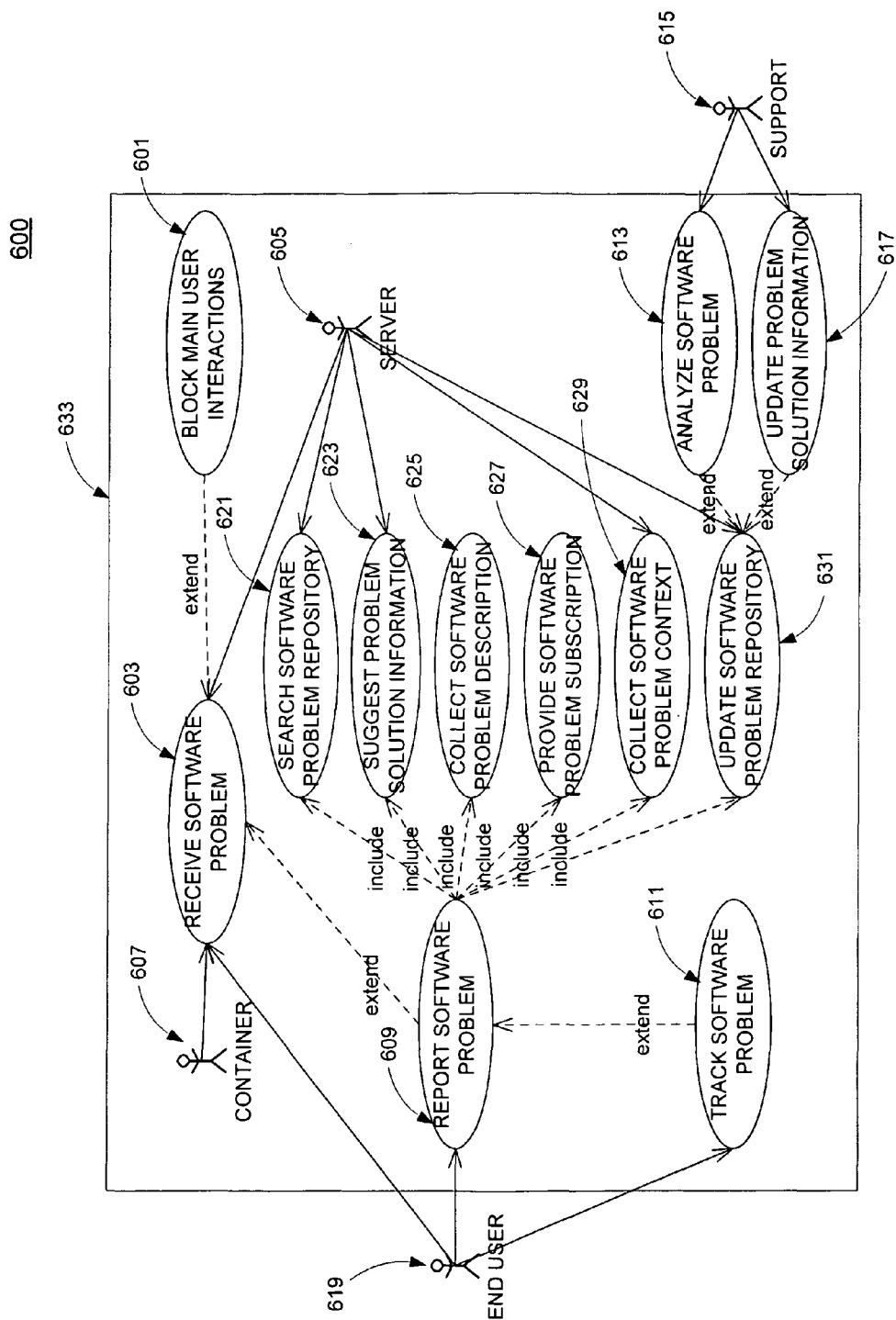
FIG. 6 is a block diagram illustrating one example of a usage scenario to report, track and identify software problems.

FIG. 6 is a block diagram illustrating one example of a usage scenario to report, track and identify software problems for handling runtime errors. Usage scenario 600 may include actors taking on usage functions via a usage system 633. In one embodiment, usage functions on usage system 633 may be performed by system 100 of FIG. 1. Usage scenario 600 may include actors such as a container actor 607, a server actor 605, an end user actor 619 and a support actor 615. A container actor 607 may be related to an exception handler module 201 of FIG. 2. A server actor 605 may be associated with a server, such as an application server 115 of FIG. 1. A usage function to receive software problems 603 may be performed by an exception handler module 201 of FIG. 2. Another usage function to report software problems 609 may extend from the usage function to receive software problems 603.

In one embodiment, a usage function to report software problems may be performed by system 200 of FIG. 2. A usage function to report software problems may include usage functions 621-631. In one embodiment, a usage function to search a software problem repository 621, a usage function to suggest problem solution information 623, a usage function to provide software subscriptions 627 and a usage function to update a software problem repository 631 may be performed in part, for example, by a solution identification module 211 of FIG. 2. A usage function to provide software problem subscriptions may be based on a database storing notification addresses associated with a subscription such as a notification register 231 of FIG. 2. In one embodiment, a usage function to collect software problem descriptions 625 and a usage function to collect software problem contexts 629 may be performed in part, for example, by an error identification module 207 of FIG. 2. A usage function to block main user interactions 601 may extend from the usage function to receive software problems 603. In one embodiment, a usage function to block main user interactions 601 may be performed in part by a user interface module 203 of FIG. 2. A usage function to analyze software problems 613 and a usage function to update problem solution information 617 may extend from a usage function to update a software problem repository 631. In one embodiment, either usage function to analyze software problems 613 or usage function to update problem solution information 617 may be performed in part by a support interface module 209 or a provider interface module 217 of FIG. 2.

Figure 7:
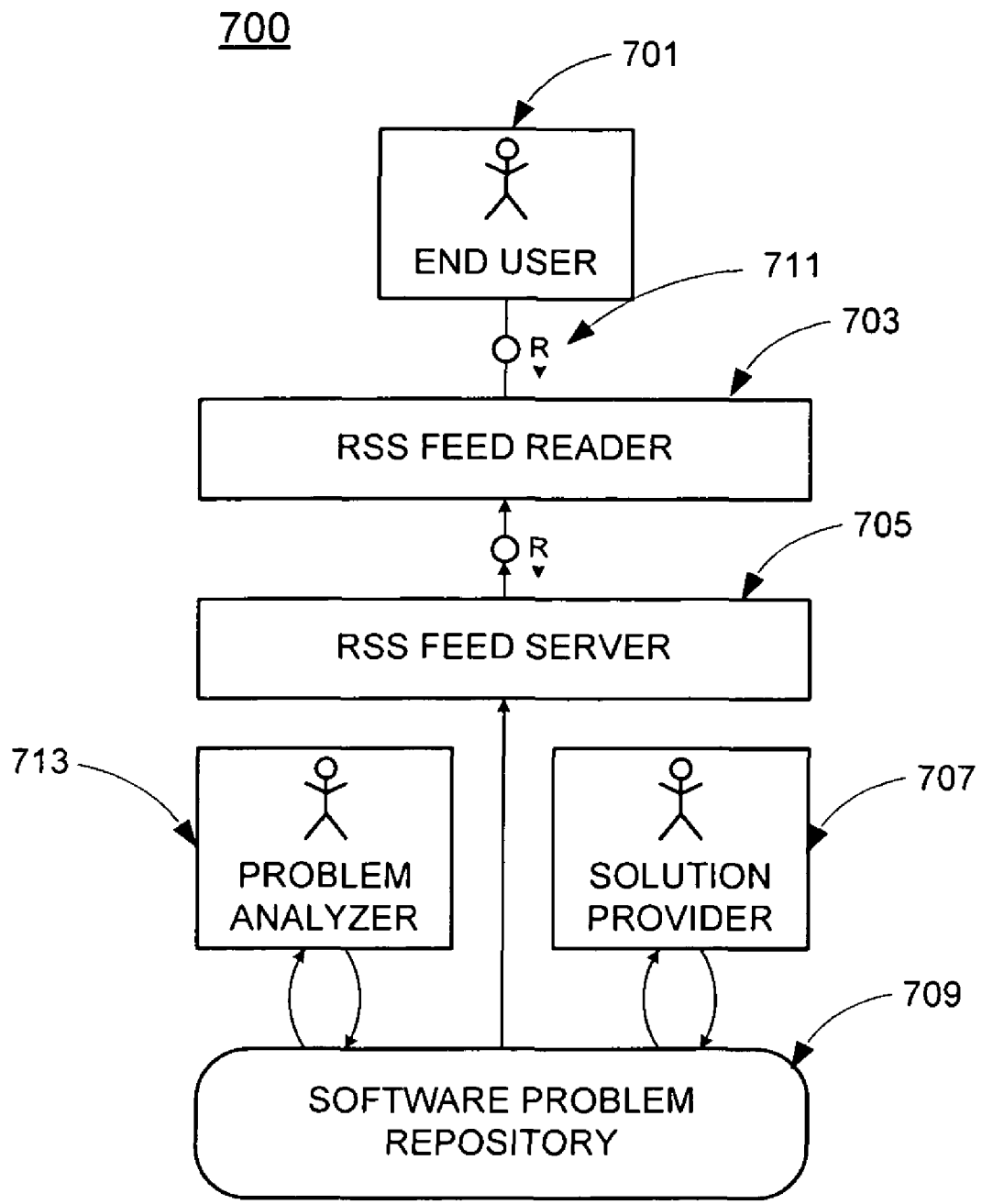
FIG. 7 is a block diagram illustrating one embodiment of a system to track software problems.

FIG. 7 is a block diagram illustrating one embodiment of a system to track software problems for handling runtime errors. System 700 may include a software problem repository 709 based on, for example, a solution database 223 of FIG. 2. A problem analyzer 713 may be a support personnel interacting with a software problem repository 709 to update descriptions of error information associated with a software problem according to, for example, a runtime error. In one embodiment, a problem analyzer 713 may interact with a software problem repository 709 via a user interface such as, for example, a support interface module 209 of FIG. 2. A solution provider 707 may insert or modify a solution to a software problem repository 709 according to, for example, error information associated with the software problem repository, such as, for example, error records 225 of FIG. 2. Interactions between a solution provider 707 and a software problem repository 709 may be based on a user interface module, such as, for example, a provider interface module 217 of FIG. 2. In one embodiment, when a solution is updated in a software problem repository 709, an RSS feed 711 may be updated via an RSS server 705 according a registered notification address for subscribing the RSS feed associated with an end user 701. A notification address for RSS feed subscription may be stored, for example, in a notification register 231 of FIG. 2.

Figure 8:
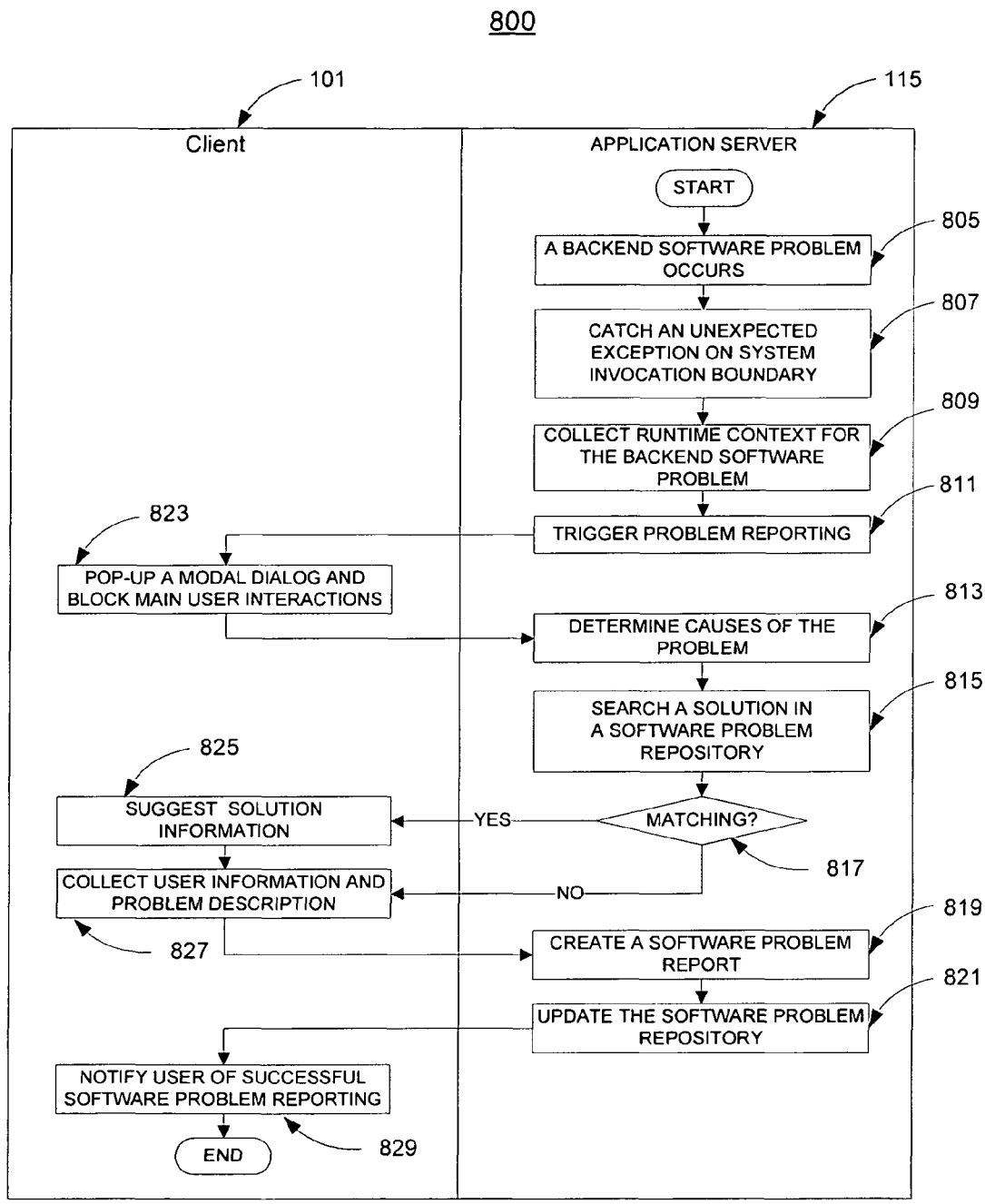
FIG. 8 is a flow diagram illustrating one embodiment of a process for handling runtime errors in a server coupled with a client.

FIG. 8 is a flow diagram illustrating one embodiment of a process for handling runtime errors in a server coupled with a client. Exemplary process 800 may be performed by processing logics that may comprise hardware (circuitry, dedicated logic, etc.), software (such as is run on a dedicated machine), or a combination of both. For example, process 800 may be performed by some components of system 100 of FIG. 1. At block 807, the processing logic of process 800 may catch a runtime error, such as an unexpected exception, occurred as a backend software problem at an application server 115. An exception may be caught at a system invocation boundary according to a module such as an exception handler module 201 of FIG. 2. A system invocation boundary may be a software layer interfacing between a software application and a hosting system, such as an operation environment, supporting the software application. In one embodiment, the processing logic of process 800 may collect a runtime context for a server software problem at block 809 based on, for example, a runtime state collection module 221 of FIG. 2. At block 811, the processing logic of process 800 may trigger software problem reporting by sending a request to a client 101 according to, for example, an error identification module 207 and an end user interface module 203 of FIG. 2.

At block 823, the processing logic of process 800 may pop-up a user interface including a modal dialog box to block interactions from a user to a running software application having a runtime error in an application server 115. In one embodiment, a modal dialog box may be based on a web page presented according to a client browser, such as browser 109 of FIG. 1. Subsequently, at block 813, the processing logic of process 800 may determine causes of the software problem, such as error information of a runtime error, based on, for example, an error identification module 207 of FIG. 2. At block 815, the processing logic of process 800 may search a solution in a software problem repository, such as a solution database 223 of FIG. 2, base on, for example, a solution identification module 211 of FIG. 2.

If a matched solution, such as an acceptable solution among potential solutions identified, is found at block 817, the processing logic of process 800 may send client 101 a report including suggestions related to solution information based on, for example, an end user interface 203 of FIG. 2. If there is no matched solution found at block 817, in one embodiment, the processing logic of process 800 may send a request to a client 101 for collecting user information and problem descriptions based on, for example, a solution identification module 211 and an end user interface module 203 of FIG. 2. At block 819, the processing logic of process 800 may create a software problem report including error descriptions such as stored in a solution database 223 of FIG. 2 based on, for example, a solution identification module 211 of FIG. 2. In one embodiment, at block 821, the processing logic of the process 800 may update a software problem repository, such as a solution database 223 of FIG. 2, based on, for example, a solution identification module 211 of FIG. 2. The processing logic of process 800 may send a notification message to a client 101 when a software problem repository is updated based on, for example, an end user interface module 203 of FIG. 2. At block 829, in one embodiment, the processing logic of process 800 may present a notification message, such as in a web page, to notify a user a software problem has been reported successfully.

Figure 9:
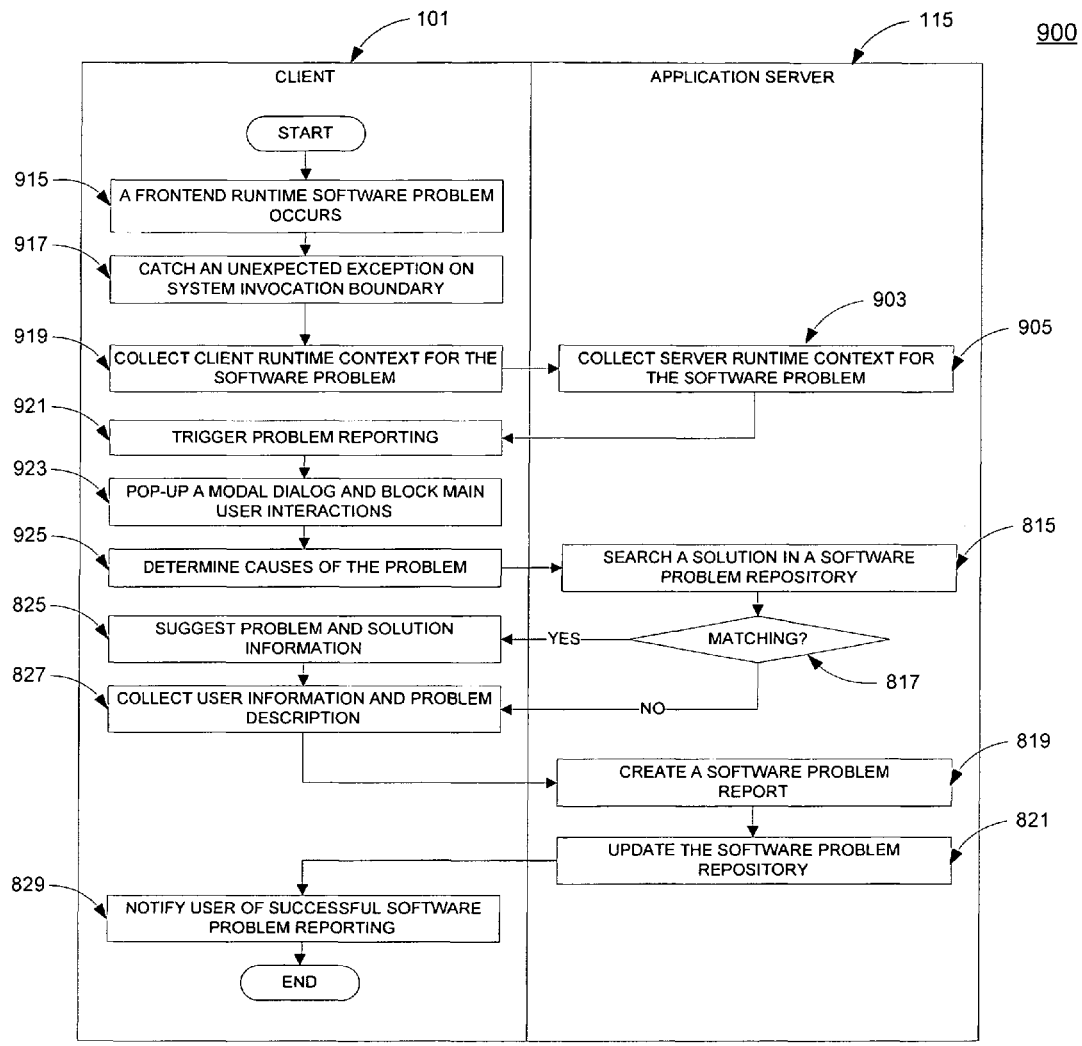
FIG. 9 is a flow diagram illustrating one embodiment of a process for handling runtime errors in a client coupled with a server.

FIG. 9 is a flow diagram illustrating one embodiment of a process for handling runtime errors in a client coupled with a server. Exemplary process 900 may be performed by processing logics that may comprise hardware (circuitry, dedicated logic, etc.), software (such as is run on a dedicated machine), or a combination of both. For example, process 900 may be performed by some components of system 100 of FIG. 1. At block 915, the processing logic of process 900 may catch a client runtime error, such as an unexpected exception, occurred as a front end software problem at a client 101. An exception may be caught at a system invocation boundary according to a module such as an exception handler module 301 of FIG. 3. In one embodiment, the processing logic of process 900 may collect client runtime context for a client software problem at block 919 based on, for example, a client runtime state collection module 309 of FIG. 3. In one embodiment, the processing logic of process 900 may send collected client runtime context to an application server 115 at block 919. At block 903, the processing logic of process 900 may collect server runtime context corresponding to the client runtime context, such as at the same time when a client runtime error occurs based on, for example, a runtime state collection module 221 of FIG. 2. Subsequently or at about the same time, the processing logic of process 900 may trigger software problem reporting at block 921. In one embodiment, the processing logic of process 900 may compare a system setting value to determine whether to trigger software problem reporting.

At block 923, the processing logic of process 900 may pop-up a user interface including a modal dialog box to block interactions from a user to a running client software application having a runtime error in a client 101. At block 925, the processing logic of process 900 may determine causes of a client software problem, such as error information of a client runtime error, based on, for example, a client error identification module 305 of FIG. 3. In one embodiment, at block 907, the processing logic of process 900 may search a solution in a software problem repository, such as a solution database 223 of FIG. 2, based on, for example, a solution identification module 211 of FIG. 2. The processing logic of process 900 may search for a solution, update a software problem repository, create a report, present a solution suggestion and send a notification to a user in a similar manner as performed by the processing logic of process 800 of FIG. 8.

Figure 10:
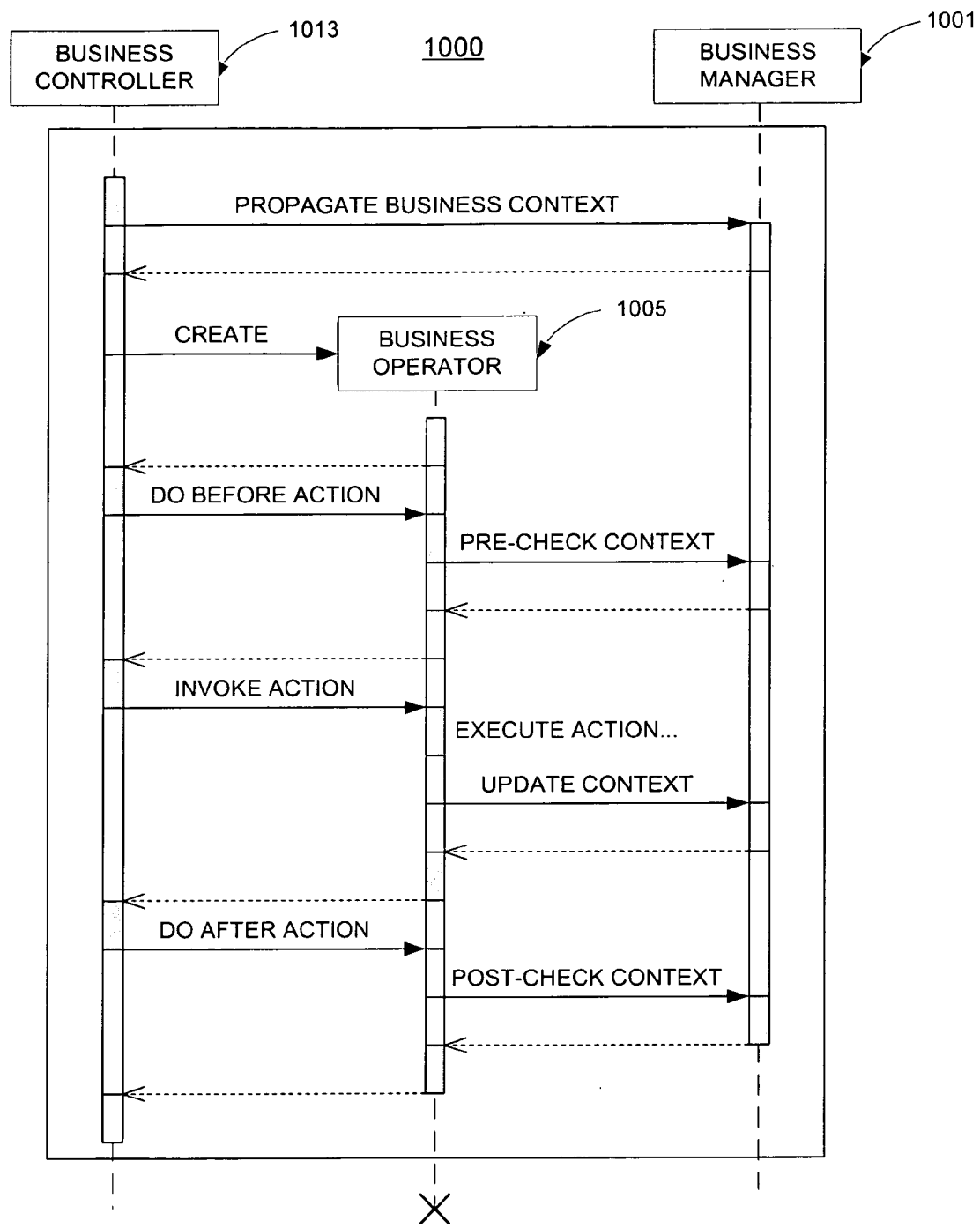
FIG. 10 is a sequence diagram illustrating one example of an interaction lifecycle for a software application that handles runtime errors.

FIG. 10 is a sequence diagram illustrating one example of an interaction lifecycle for a software application that handles runtime errors. In one embodiment, a software application, such as an application plug-in 123 of FIG. 1, may include a business controller 1013, a business manager 1001 and a business operator 1005 running in a client, such as client 101 of FIG. 1. In another embodiment, a business controller 1013, a business manager 1001 and a business operator 1005 may belong to a software application running in a server, such as an application server 115 of FIG. 1. A business controller 1013 may be associated with system invocation boundaries between a software application and a hosting system. In one embodiment, a business controller 1013 may catch exceptions caused by associated software applications and handle corresponding runtime errors, for example, according to system 200 of FIG. 2. In one embodiment, a business controller may include an exception handler, such as an exception handler module 201 of FIG. 2. A business controller 1013 may create a business operator 1005 to invoke the business operator to perform business actions based on business contexts. A business context may be one of business objects, such as business objects 119 of FIG. 1. A business object may include, for example, data structures related to business transactions. In one embodiment, a business controller 1013 may propagate business contexts for a business operator 1005 to perform business actions. A business manager 1001 may maintain, e.g. update, check, and business contexts.

Figure 11:
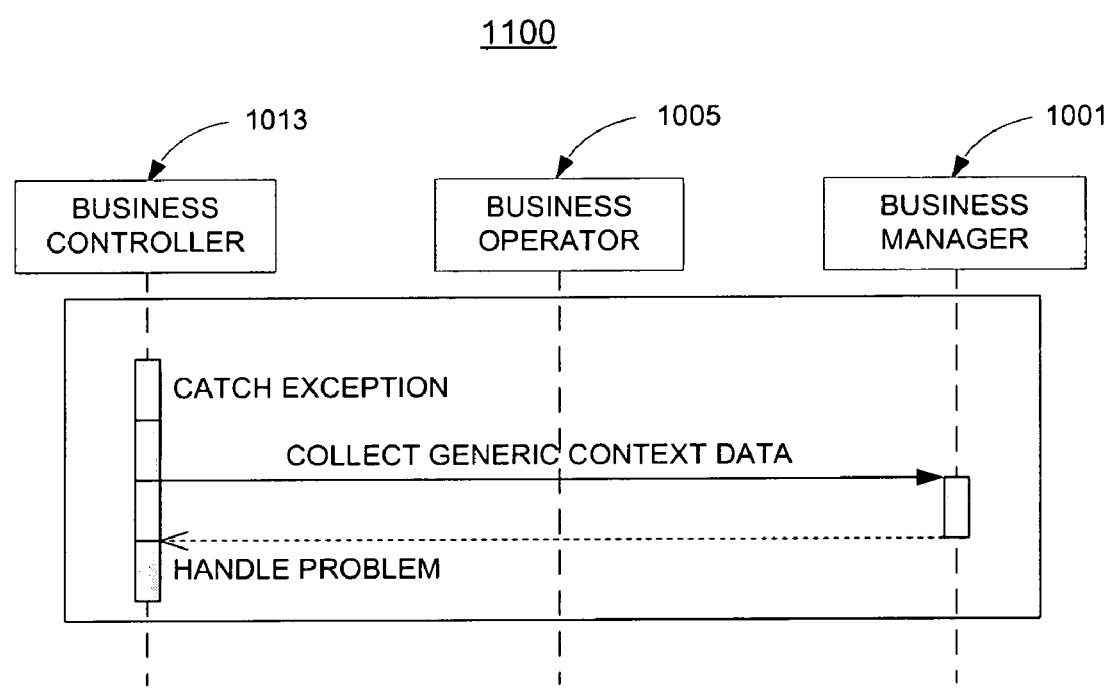
FIG. 11 is a sequence diagram illustrating an example for software applications to handle generic runtime errors.

FIG. 11 is a sequence diagram illustrating an example for software applications to handle generic runtime errors caused by, for example, technical exceptions. A technical exception may be associated with a programming error, such as NullPointerException, ClassCastException, or ArrayIndexOutOfBoundException, etc. Additionally, a runtime execution error such as Security Exception, or System Landscape Exception, related to security and/or system setting violation, may result in a technical exception. A business manager 1001 may collect runtime state data including generic context data associated with a running software application. Generic context data may be a user identity, a session identity, a transaction identity, a timestamp, a user role name, a user group name, a runtime log, a stack trace, information associated with the software application, and/or information associated with a hosting system, etc. In one embodiment, a module to collect runtime state data, such as a runtime state collection module 221 of FIG. 2, may include a business manager 1001 to collect generic context data.

Figure 12:
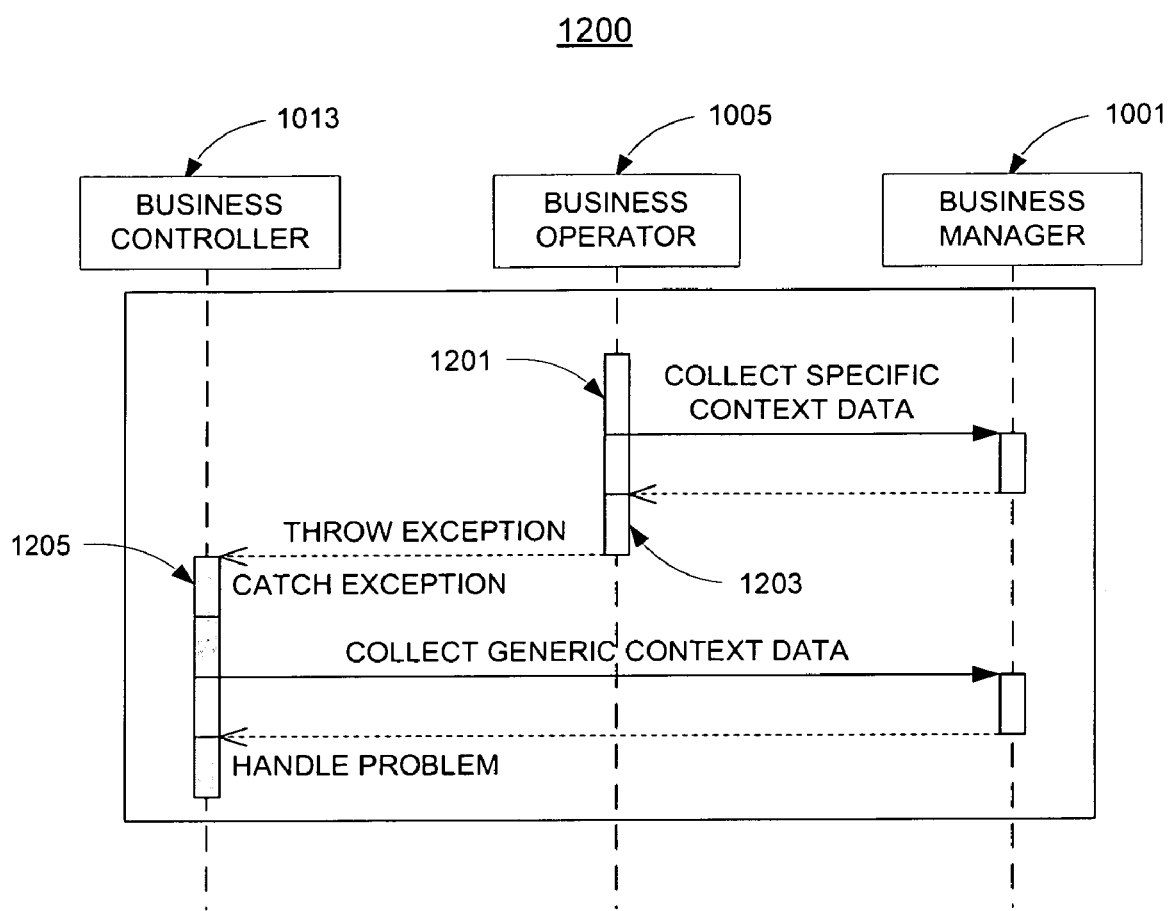
FIG. 12 is a sequence diagram illustrating an example for software applications to handle application specific runtime errors.

FIG. 12 is a sequence diagram illustrating an example for software applications to handle application specific runtime errors. In one embodiment, a runtime error may cause a business operator 1005 to collect error information, such as specific context data from a business manager 1001 during period 1201. A business operator 1005 may call a system API (application programming interface) with collected error information to generate an error notification during period 1203. In one embodiment, during period 1205, a business controller 1013 may catch an exception to receive an error notification including the collected error information such as specific context data according to a business operator 1005. Subsequently, a business controller 1013 may perform operations following a sequence of operations, for example, similar to the sequence of operations in FIG. 11, to handle associated runtime errors.

Figure 13:
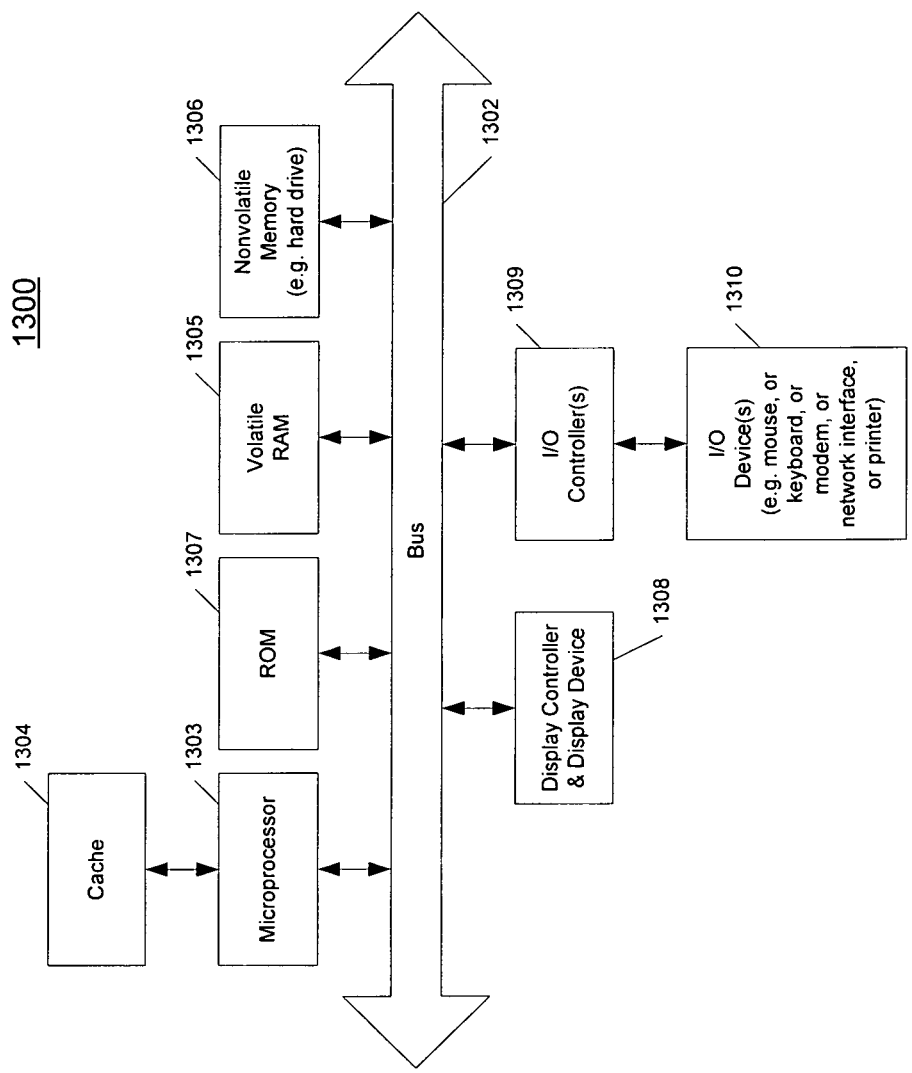
FIG. 13 illustrates one example of a computer system which may be used with one embodiment of the present invention.

FIG. 13 shows one example of a computer system 1301 which may be used to implement an embodiment of the present invention. For example, system 1300 may be used as part of a client system and/or a server system as described above. Note that while FIG. 13 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 13, the computer system 1301, which is a type of a data processing system, includes a bus 1303 which is coupled to a microprocessor(s) 1305 and a ROM (Read Only Memory) 1307 and volatile RAM 1309 and a non-volatile memory 1211. The microprocessor 1303 may retrieve the instructions from the memories 1307 1309 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1317. The volatile RAM (Random Access Memory) 1309 is typically implemented as dynamic RAM (DRAM) which requires power continually in order to refresh or maintain the data in the memory.

The mass storage 1311 is typically a magnetic hard drive or a magnetic optical drive or an optical drive or a DVD RAM or other types of memory systems which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1303 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In addition, the operations described above may be performed by an apparatus. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not specifically related to a particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the scope of the invention

What is claimed is:

1. A computer method for analyzing execution of a software application, the method comprising:
    generating, in response to receiving an error notification associated with a runtime error of a software application, a plurality of context attributes from a runtime state of the software application, the runtime state being associated with an instant of time of the runtime error;
    searching for one or more potential solutions from a data storage including a solution repository based on the plurality of context attributes at substantially the same instant of time, wherein the searching is based on a search setting;
    determining an acceptable solution for the runtime error based on the one or more potential solutions;
    updating the solution repository with a new solution if the acceptable solution cannot be determined;
    storing the plurality of context attributes into the data storage; and
    updating the search setting, wherein a plurality of potential solutions from the updated solution repository are searched based on the plurality of context attributes according to the updated search setting, and wherein the plurality of potential solutions include the new solution description.

2. The method of claim 1, wherein the plurality of context attributes include one or more business context attributes and wherein generating a plurality of context attributes further comprises:
    determining the one or more business context attributes from a business context of the runtime state of the software application according to a type of the runtime error.

3. The method of claim 2, wherein the business context attributes include an expected value attribute, an actual value attribute and a comment attribute, the comment attribute being associated with a text value.

4. The method of claim 1, wherein searching for one or more potential solutions comprises:
    assigning confidence values to the one or more potential solutions; and
    ranking the one or more potential solutions according to the confidence values.

5. The method of claim 4, wherein the acceptable solution is determined based on the confidence values.

6. The method of claim 5, further comprising:
    presenting the one or more potential solutions in an order based on the ranking.

7. The method of claim 1, wherein the plurality of context attributes include one or more client context attributes and one or more server context attributes, wherein the method further comprises:
    generating the one or more server context attributes in response to receiving a message including the one or more client context attributes.

8. A method, comprising:
    executing, in response to receiving a software plug-in from a remote server, the software plug-in to run a software application;
    generating, in response to receiving an error notification from a runtime error of the software application, an error message including a plurality of context attributes from a runtime state of the software application, the runtime state being associated with an instant of time of the runtime error;
    sending the error message to the remote server;
    presenting, in response to receiving a response based on the plurality of context attributes from the remote server, a user interface including the response for the runtime error;
    wherein
        the response is configured to include an acceptable solution for the runtime error based on one or more potential solutions from a data storage including a solution repository, wherein the one or more potential solutions are searched based on the plurality of context attributes at substantially the same instant of time,
        the solution repository is updated with a new solution if the acceptable solution cannot be determined;
        the search for one or more potential solutions is based on a search setting,
        the plurality of context attributes are stored into the data storage; and
        the search setting is updated, wherein a plurality of potential solutions from the updated solution repository are searched based on a plurality of context attributes according to the updated search setting, and wherein the plurality of potential solutions include the new solution description.

9. The method of claim 8, further comprising:
    sending a notification address to the remote server to register the notification address via the user interface to receive notification messages include solutions to the runtime error, wherein the response includes a message indicating the runtime error has been reported.

10. A machine-readable storage medium having instructions therein, which when executed by a machine, causes the machine to perform a method for analyzing execution of a software application, the method comprising:
    generating, in response to receiving an error notification associated with a runtime error of a software application, a plurality of context attributes from a runtime state of the software application, the runtime state being associated with an instant of time of the runtime error;
    searching for one or more potential solutions from a data storage including a solution repository based on the plurality of context attributes at substantially the same instant of time, wherein the searching is based on a search setting;
    determining an acceptable solution for the runtime error based on the one or more potential solutions;
    updating the solution repository with a new solution if the acceptable solution cannot be determined;
    storing the plurality of context attributes into the data storage; and updating the search setting, wherein a plurality of potential solutions from the updated solution repository are searched based on the plurality of context attributes according to the updated search setting, and wherein the plurality of potential solutions include the new solution description.

11. The machine-readable storage medium of claim 10, wherein the plurality of context attributes include one or more business context attributes and wherein generating a plurality of context attributes further comprises:

determining the one or more business context attributes from a business context of the runtime state of the software application according to a type of the runtime error.

12. The machine-readable storage medium of claim 11, wherein the business context attributes include an expected value attribute, an actual value attribute and a comment attribute, the comment attribute being associated with a text value.

13. The machine-readable storage medium of claim 10, wherein searching for one or more potential solutions comprises:

assigning confidence values to the one or more potential solutions; and ranking the one or more potential solutions according to the confidence values.

14. The machine-readable storage medium of claim 13, wherein the acceptable solution is determined based on the confidence values.

15. The machine-readable storage medium of claim 14, further comprising:

presenting the one or more potential solutions in an order based on the ranking.

16. The machine-readable storage medium of claim 10, wherein the plurality of context attributes include one or more client context attributes and one or more server context attributes, and wherein the method further comprises:

generating the one or more server context attributes in response to receiving a message including the one or more client context attributes.

17. A machine-readable storage medium having instructions therein, which when executed by a machine, causes the machine to perform a method, the method comprising:

executing, in response to receiving a software plug-in from a remote server, the software plug-in to run a software application;

generating, in response to receiving an error notification from a runtime error of the software application, an error message including a plurality of context attributes from a runtime state of the software application, the runtime state being associated with an instant of time of the runtime error;

sending the error message to the remote server;

presenting, in response to receiving a response based on the plurality of context attributes from the remote server, a user interface including the response for the runtime time error;

wherein the response is configured to include an acceptable solution for the runtime error based on one or more potential solutions from a data storage including a solution repository, wherein the one or more potential solutions are searched based on the plurality of context attributes at substantially the same instant of time, the solution repository is updated with a new solution if the acceptable solution cannot be determined;

the search for one or more potential solutions is based on a search setting, the plurality of context attributes are stored into the data storage; and the search setting is updated, wherein a plurality of potential solutions from the updated solution repository are searched based on the plurality of context attributes according to the updated search setting, and wherein the plurality of potential solutions include the new solution description.

18. The machine-readable storage medium of claim 17, wherein the method further comprises:

sending a notification address to the remote server to register the notification address via the user interface to receive notification messages include solutions to the runtime error, wherein the response includes a message indicating the runtime error has been reported.

* * * * *